United States Patent
Richter et al.

(10) Patent No.: US 12,532,029 B2
(45) Date of Patent: Jan. 20, 2026

(54) WAVELET-BASED ENCODING OF A VIDEO SEQUENCE AND WAVELET-BASED DECODING OF A BIT STREAM

(71) Applicant: Fraunhofer-Gesellschaft zur Förderung der angewandten Forschung e.V., Munich (DE)

(72) Inventors: Thomas Richter, Erlangen (DE); Siegfried Fößel, Erlangen (DE); Wolfgang Heppner, Erlangen (DE); Christian Scherl, Erlangen (DE); Christian Minuth, Erlangen (DE); Bilal Ahmed, Erlangen (DE); Nisha Bhaskar, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 83 days.

(21) Appl. No.: 18/365,256

(22) Filed: Aug. 4, 2023

(65) Prior Publication Data
US 2025/0024079 A1    Jan. 16, 2025

Related U.S. Application Data

(60) Provisional application No. 63/513,393, filed on Jul. 13, 2023.

(51) Int. Cl.
*H04N 19/635* (2014.01)
*H04N 19/124* (2014.01)
(Continued)

(52) U.S. Cl.
CPC ......... *H04N 19/635* (2014.11); *H04N 19/124* (2014.11); *H04N 19/184* (2014.11); *H04N 19/91* (2014.11)

(58) Field of Classification Search
CPC .. H04N 19/635; H04N 19/124; H04N 19/184; H04N 19/91; H04N 19/18; H04N 19/61; H04N 19/63
See application file for complete search history.

(56) References Cited

U.S. PATENT DOCUMENTS

2003/0133500 A1* 7/2003 Auwera ............... H04N 19/619
                                                       375/E7.044
2011/0134999 A1* 6/2011 Han ....................... H04N 19/63
                                                       375/240.18
(Continued)

FOREIGN PATENT DOCUMENTS

TW          202141992 A   * 11/2021   ........... H04N 19/124

OTHER PUBLICATIONS

International Standard; "Information Technology—Coding of Moving Pictures and Associated Audio for Digital Storage Media at up to about 1,5 Mbits; Part 3: Audio" ISO/IEC 11172; Dec. 1991; pp. 1-158.
(Continued)

*Primary Examiner* — Tracy Y. Li
(74) *Attorney, Agent, or Firm* — McClure, Qualey & Rodack, LLP

(57) ABSTRACT

Disclosed is an encoder for encoding a video sequence comprising consecutive frames into a bit stream, a method for encoding a video sequence comprising consecutive frames into a bit stream, a decoder for decoding a bit stream in order to reconstruct a video sequence comprising consecutive frames and a method for decoding a bit stream in order to reconstruct a video sequence comprising consecutive frames.

15 Claims, 3 Drawing Sheets

(51) Int. Cl.
*H04N 19/184* (2014.01)
*H04N 19/91* (2014.01)

(56) References Cited

U.S. PATENT DOCUMENTS

2011/0293195 A1* 12/2011 Nakagami .............. H04N 19/82
382/233
2021/0344921 A1* 11/2021 Kim ..................... H04N 19/132
2022/0109843 A1* 4/2022 Yoon .................. H04N 19/1883

OTHER PUBLICATIONS

International Telecommunication Union; "Terminal Equipment and Protocols for Telematic Services;" ISO/IEC 10918; Aug. 1992; pp. 1-186.
International Telecommunication Union; "Series H: Audiovisual and Multimedia Systems Infrastructure of audiovisual services—Coding of moving video; Advanced video coding for generic audiovisual services;" H.264; Aug. 2004; pp. 1-332.
International Telecommunication Union; "Series H: Audiovisual and Multimedia Systems Infrastructure of audiovisual services—Coding of moving video; Versatile video coding;" H.266; Jun. 2013; pp. 1-516.
International Search Report and Written Opinion dated Oct. 2, 2024, issued in application No. PCT/EP2024/068635.
Richter, T., et al.; "JPEG XS screen content coding extensions;" Proceedings of the SPIE; SPIE; vol. 12226; Oct. 2022; pp. 122260R-1 thru 122260R-8.
Descampe, A., et al.; "JPEG XS—A New Standard for Visually Lossless Low-Latency Lightweight Image Coding;" Proceedings of the IEEE; IEEE; vol. 109; No. 9; May 2021; pp. 1559-1577.
International Standard; "Information technology—JPEG XS low-latency lightweight image coding system—Part 1: Core coding system;" ISO/IEC 21122-1 :2019, IEC, 3; May 2019; pp. 1-70.
Salomon, D .; "Data Compression—The Complete Reference; Data Compression—The Complete Reference;" 2007; pp. iii,iv,676-718.
Foessel, S., et al.; "Coding Techniques in JPEG XS for efficient Video Production and Contribution;" Proceedings of the 28th ACM Symposium on Access Control Models and Technologies; May 2023; pp. 72-77.
H.261; "Line Transmission of non-telephone Signals;" Telecommunication Standardization Sector of ITU; Mar. 1993; pp. 1-29.
ISO/IEC 21122-1; "JPEG XS low-latency lightweight image coding system, Part 1: Core coding system;" International Standard; May 2019; pp. 1-78.

* cited by examiner

WAVELET-BASED ENCODING OF A VIDEO SEQUENCE AND WAVELET-BASED DECODING OF A BIT STREAM

TECHNICAL FIELD

Embodiments relate to video coding, in particular to wavelet-based video coding.

BACKGROUND OF THE INVENTION

It is an object of the disclosure to provide more efficient coders and coding schemes which allow for a bit saving while maintaining a high quality of the reconstructed video compared to the prior art.

SUMMARY OF THE INVENTION

In a first aspect, the disclosure provides an encoder for encoding a video sequence comprising consecutive frames into a bit stream. The encoder comprises:
  a wavelet transform processor configured for producing for each of the frames a wavelet-filtered frame comprising a plurality of bands, wherein each of the bands comprises a plurality of wavelet coefficients, wherein wavelet coefficients of the plurality of wavelet coefficients of the plurality of bands, which represent a group of rows of one of the frames, form a precinct, wherein each of the wavelet coefficients of the wavelet-filtered frame is calculated by applying a discrete wavelet transform operation to the frame so as to produce an intermediate wavelet-filtered frame and by applying a time transform operation to the respective intermediate wavelet-filtered frame and on data calculated from one or more intermediate wavelet-filtered frames preceding the respective intermediate wavelet-filtered frame, wherein the time transform operation is applied in such way that each of the wavelet coefficients is calculated by using a coding mode of a plurality of coding modes;
  a mode selecting processor configured for providing for each band of each precinct of the wavelet coefficients the coding mode to be used for calculating the respective wavelet coefficient to the wavelet transform processor, wherein the mode selecting processor is configured for selecting the coding mode depending on the band, to which the respective wavelet coefficient belongs, and depending on the precinct, to which the respective wavelet coefficient belongs;
  a quantization processor configured for producing for each of the wavelet-filtered frames a quantized wavelet-filtered frame, wherein each of the quantized wavelet-filtered frames comprises a plurality of quantized wavelet coefficients, wherein the quantization processor is configured to calculate each of the quantized wavelet coefficients depending on a quantization value, which is a non-negative integer, wherein the quantization value depends on the coding mode of the respective wavelet coefficient;
  a plurality of tables, wherein each table of the tables relates to one coding mode of the plurality of coding modes, wherein each of the tables contains for each band of each precinct of one of the frames a gain value related to the coding mode to which the respective table relates;
  a rate allocator configured for calculating the quantization value for each of the wavelet coefficients depending on a quantization parameter for the precinct of the respective wavelet coefficient, wherein the quantization parameter is determined iteratively by the rate allocator in order to control a data rate of the bit stream, wherein the rate allocator retrieves the gain value for each of the wavelet coefficients, depending on the band of the respective wavelet coefficient from the table of the plurality of tables, which relates to the coding mode of the respective wavelet coefficient, wherein the respective quantization value is calculated depending on the retrieved gain value;
  an encoding processor configured for producing for each of the quantized wavelet-filtered frames an encoded quantized wavelet-filtered frame, wherein each of the encoded quantized wavelet-filtered frames comprises a plurality of encoded quantized wavelet coefficients;
  a data stream producer configured for embedding the encoded quantized wavelet-filtered frames, the plurality of tables, for each band of each precinct of the wavelet coefficients the coding mode, and the quantization parameter for each of the precincts into the bit stream.

According to some embodiments, the quantization processor is a dead-zone de-quantization processor.

According to some embodiments, the quantization processor is a uniform de-quantization processor.

According to some embodiments, wherein the quantization processor is configured to calculate each of the quantized wavelet coefficients by dividing the respective wavelet coefficient by $2^T$, wherein T is the quantization value.

According to some embodiments, at least one band of a precinct comprises a plurality of time differential coding (TDC)-selection groups, each comprising k wavelet coefficients, wherein the wavelet coefficients of one of the TDC-selection groups are calculated using a sub-mode of one of the coding modes, which is determined by the mode selecting processor, wherein the data stream producer is configured for embedding into the bit stream for one of the TDC-selection groups a bit shift parameter, which is an integer and which depends on the sub-mode of the respective TDC-selection group.

According to some embodiments, a value of k is 32.

According to some embodiments, the encoder comprises a rate provider configured for providing a maximum data rate to the rate allocator, wherein the rate allocator is configured to calculate the quantization values in such way that a data rate of the bitstream is lower or equal than the maximum data rate.

According to some embodiments, each of the tables contain for each band of one of the frames a band weight related to the coding mode to which the respective table relates, wherein the rate allocator is configured in such way, that, in case that the data rate is smaller than the maximum data rate, additional data rate is, depending on the band weights retrieved from the table, allocated to one or more bands by decreasing the quantization values for the one or more bands.

According to some embodiments, the rate allocator is configured for calculating the quantization value for each of the wavelet coefficients depending on a refinement parameter for the precinct of the respective wavelet coefficient, wherein the refinement parameter is determined iteratively by the rate allocator in order to control a data rate of the bit stream, wherein the data stream producer is configured for embedding the refinement parameter for each of the precincts into the bit stream.

According to some embodiments, the rate allocator is configured for calculating the quantization value for each of the wavelet coefficients depending on a predefined amplitude control parameter for the respective frame, wherein the data stream producer configured for embedding the amplitude control parameter for each of the frames into the bit stream.

According to some embodiments, the rate allocator is configured for calculating the quantization values for a band of a precinct of one of the frames, according to the formula $$T = \text{clamp}\left(q[p] - g[i,m] - X_{w[i,m] < r[p]}, 0, 2^{Br} - 1\right),$$

wherein m is one of the coding mode, wherein T is the quantization value, wherein g [i, m] is the gain value for the i-th band retrieved from the table related to the respective coding mode, w [i, m] is the band weight for the i-th band retrieved from the table related to the respective coding mode, wherein Br is the amplitude control parameter for the frame, wherein X is an indicator function, which is 1, if the index is true, and 0, if the index is not true, wherein clamp is a function, which limits an output calculated from a first argument to an interval indicated by a second argument and a third argument, wherein q [p] is the quantization parameter for the p-th precinct, and r [p] is the refinement parameter for the p-th precinct.

According to some embodiments, at least one band of a precinct comprises a plurality of TDC-selection groups, each comprising k wavelet coefficients, wherein the wavelet coefficients of one of the TDC-selection groups are calculated using a sub-mode of one of the coding modes, which is determined by the mode selecting processor, wherein the data stream producer is configured for embedding into the bit stream for one of the TDC-selection groups a bit shift parameter, which is an integer and which depends on the sub-mode of the respective TDC-selection group;

wherein the rate allocator is configured for calculating the quantization values for one of the TDC-selection groups of one of the frames, according to the formula $$T = \text{clamp}\left(q[p] + b[m'] - g[i,m] - X_{w[i,m] < r[p]}, 0, 2^{Br} - 1\right),$$

wherein m' is the sub-mode of the TDC-selection group, wherein b is the bit shift parameter for the sub-mode of the TDC-selection group.

According to some embodiments, at least one band of a precinct comprises a plurality of TDC-selection groups, each comprising k wavelet coefficients, wherein the wavelet coefficients of one of the TDC-selection groups are calculated using a sub-mode of one of the coding modes, which is determined by the mode selecting processor, wherein the data stream producer is configured for embedding into the bit stream for one of the TDC-selection groups a bit shift parameter, which is an integer and which depends on the sub-mode of the respective TDC-selection group;

wherein the quantization processor is configured for calculating the quantized wavelet coefficients for one of the TDC-selection groups of one of the frames by calculating intermediate quantized wavelet coefficients depending on the quantization value for the band of the precinct of the respective TDC-selection group by dividing each of the wavelet coefficients by $2_{b\,[m']}$ and by quantizing the intermediate quantized wavelet coefficients depending on the quantization value for the band of the precinct of the respective TDC-selection group, wherein m' is the sub-mode of the TDC-selection group, wherein b is the bit shift parameter for the sub-mode (SM) of the TDC-selection group.

According to some embodiments, the encoding processor is a variable length encoder or an entropy encoder.

In a further aspect, the disclosure provides a method for encoding a video sequence comprising consecutive frames into a bit stream. The method comprising the steps of:

using a wavelet transform processor for producing for each of the frames a wavelet-filtered frame comprising a plurality of bands, wherein each of the bands comprises a plurality of wavelet coefficients, wherein wavelet coefficients of the plurality of wavelet coefficients of the plurality of bands, which represent a group of rows of one of the frames, form a precinct, wherein each of the wavelet coefficients of the wavelet-filtered frame is calculated by applying a discrete wavelet transform operation to the frame so as to produce an intermediate wavelet-filtered frame and by applying a time transform operation to the respective intermediate wavelet-filtered frame and on data calculated from one or more intermediate wavelet-filtered frames preceding the respective intermediate wavelet-filtered frame, wherein the time transform operation is applied in such way that each of the wavelet coefficients is calculated by using a coding mode of a plurality of coding modes;

using a mode selecting processor for providing for each band of each precinct of the wavelet coefficients the coding mode to be used for calculating the respective wavelet coefficient to the wavelet transform processor, wherein the mode selecting processor is used for selecting the coding mode depending on the band, to which the respective wavelet coefficient belongs, and depending on the precinct, to which the respective wavelet coefficient belongs;

using a quantization processor for producing for each of the wavelet-filtered frames a quantized wavelet-filtered frame, wherein each of the quantized wavelet-filtered frames comprises a plurality of quantized wavelet coefficients, wherein the quantization processor is used to calculate each of the quantized wavelet depending on a quantization value, which is a non-negative integer, wherein the quantization value depends on the coding mode of the respective wavelet coefficient;

providing a plurality of tables, wherein each table of the tables relates to one coding mode of the plurality of coding modes, wherein each of the tables contains for each band of one of the frames a gain value related to the coding mode to which the respective table relates;

using a rate allocator for calculating the quantization value for each of the wavelet coefficients depending on a quantization parameter for the precinct of the respective wavelet coefficient, wherein the quantization parameter is determined iteratively by the rate allocator in order to control a data rate of the bit stream, wherein the rate allocator retrieves the gain value for each of the wavelet coefficients, depending on the band of the respective wavelet coefficient from the table of the plurality of tables, which relates to the coding mode of the respective wavelet coefficient, wherein the respective quantization value is calculated depending on the retrieved gain value;

using an encoding processor for producing for each of the quantized wavelet-filtered frames an encoded quantized wavelet-filtered frame, wherein each of the encoded quantized wavelet-filtered frames comprises a plurality of encoded quantized wavelet coefficients;

using a data stream producer configured for embedding the encoded quantized wavelet-filtered frames, the plurality of tables, for each band of each precinct of the wavelet coefficients the coding mode, and the quantization parameter for each of the precincts into the bit stream.

In a further aspect, the disclosure provides a computer program for, when running on a processor, executing the encoding method according to the disclosure.

In a further aspect, the disclosure provides a decoder for decoding a bit stream in order to reconstruct a video sequence comprising consecutive frames. The decoder comprising;

a data stream receiver configured for extracting from the bit stream for each of the frames
an encoded quantized wavelet-filtered frame comprising a plurality of bands, wherein each of the bands comprises a plurality of encoded quantized wavelet coefficients, wherein encoded quantized wavelet coefficients of the plurality of bands, which represent a group of rows of one of the frames, form a precinct, wherein the encoded quantized wavelet coefficients of the encoded quantized wavelet-filtered frame have been calculated using a coding mode of a plurality of coding modes,
a plurality of tables, wherein each table of the plurality of tables relates to one coding mode of the plurality of coding modes, wherein each of the tables contains for each band of the encoded quantized wavelet-filtered frame a gain value related to the coding mode to which the respective table relates;
for each band of each precinct the coding mode of the encoded quantized wavelet coefficients, and
a quantization parameter for each of the precincts;
a decoding processor configured for producing for each of the encoded quantized wavelet-filtered frames a decoded quantized wavelet-filtered frame, wherein each of the decoded quantized wavelet-filtered frames comprises a plurality of decoded quantized wavelet coefficients, which are calculated by decoding the encoded quantized wavelet coefficients of the respective encoded quantized wavelet-filtered frame;
a de-quantization processor configured for producing for each of the decoded quantized wavelet-filtered frames a de-quantized wavelet-filtered frame, wherein each of the de-quantized wavelet-filtered frames comprises a plurality of de-quantized wavelet coefficients, wherein the de-quantization processor is configured to calculate each of the de-quantized wavelet coefficients depending on a quantization value, which is a non-negative integer, wherein the de-quantization processor is configured for calculating the quantization value for each of the decoded quantized wavelet coefficients depending on the quantization parameter for the precinct of the respective decoded quantized wavelet coefficient, depending on the coding mode of the precinct and the band of the encoded quantized wavelet coefficient corresponding to the respective decoded quantized wavelet coefficient, and depending on one of the gain values from the plurality of tables;
wherein the de-quantization processor is configured for retrieving the gain value for each of the decoded quantized wavelet coefficients, depending on the band of the respective decoded quantized wavelet coefficient from the table of the plurality of tables, which relates to the coding mode of the respective decoded quantized wavelet coefficient;
an inverse wavelet transform processor configured for producing for each of the de-quantized wavelet-filtered frames a frame of the consecutive frames, wherein each of the frames comprises a plurality of pixels, wherein each of the pixels of the frame is calculated by applying an inverse time transform operation to the respective de-quantized wavelet-filtered frame and on data calculated from one or more de-quantized wavelet-filtered frame preceding the respective de-quantized wavelet-filtered frame so as to produce an inverse time transformed de-quantized wavelet-filtered frame and by applying an inverse discrete wavelet transform to the inverse time transformed de-quantized wavelet-filtered frame, wherein the inverse time transform operation is applied in such way that each of the pixels is calculated by using a decoding mode of a plurality of decoding modes, wherein the decoding mode of one of the pixels correspond to the coding mode by which the encoded quantized wavelet coefficient corresponding to the one of the pixels has been calculated.

According to some embodiments, the de-quantization processor is a dead-zone de-quantization processor.

According to some embodiments, the de-quantization processor is a uniform de-quantization processor.

According to some embodiments, wherein the de-quantization processor is configured to calculate each of the de-quantized wavelet coefficients by multiplying the respective decoded quantized wavelet coefficient by $2^T$, wherein T is the quantization value.

According to some embodiments, at least one band of at least one precinct comprises a plurality of TDC-selection groups, each comprising k encoded quantized wavelet coefficients, wherein the encoded quantized wavelet coefficients of one of the TDC-selection groups have been calculated using a sub-mode of one of the coding modes, wherein the data stream receiver is configured for extracting from the bit stream for one of the TDC-selection groups a bit shift parameter, which is an integer and which depends on the frame and the sub-mode of the respective TDC-selection group.

According to some embodiments, a value of k is 32.

According to some embodiments, each of the tables contain for each band of one of the encoded quantized wavelet-filtered frame a band weight related to the coding mode to which the respective table relates.

According to some embodiments, the data stream receiver is configured for extracting from the bit stream for each of the frames a refinement parameter for each of the precincts, wherein the de-quantization processor is configured for calculating the quantization values for each of the precincts depending on the refinement parameter for the respective precinct.

According to some embodiments, the data stream receiver is configured for extracting from the bit stream for each of the frames an amplitude control parameter, wherein the de-quantization processor is configured for calculating the quantization values for each of the precincts depending on the amplitude control parameter for the respective frame.

According to some embodiments, the de-quantization processor is configured for calculating the quantization values for a band of a precinct of one of the frames according to the formula $$T = \text{clamp}\left(q\,[p] - g\,[i,\,m] - X_{w[i,m]<r[p]},\,0,\,2^{Br} - 1\right),$$

wherein m is the coding mode, wherein T is the quantization value, wherein g [i, m] is the gain value for the i-th band retrieved from the table related to the respective coding mode, w [i, m] is the band weight for the i-th band retrieved from the table related to the respective coding mode, wherein Br is the amplitude control parameter for the frame, wherein X is an indicator function, which is 1, if the index is true, and 0, if the index is not true, wherein clamp is a function, which limits an output calculated from a first argument to an interval indicated by a second argument and a third argument, wherein q [p] is the quantization parameter for the p-th precinct, and r [p] is the refinement parameter for the p-th precinct.

According to some embodiments, at least one band of at least one precinct comprises a plurality of TDC-selection groups, each comprising k encoded quantized wavelet coefficients, wherein the encoded quantized wavelet coefficients of one of the TDC-selection groups have been calculated using a sub-mode of one of the coding modes, wherein the data stream receiver is configured for extracting from the bit stream for one of the TDC-selection groups a bit shift parameter, which is an integer and which depends on the frame and the sub-mode of the respective TDC-selection group.

According to some embodiments, a value of k is 32.

According to some embodiments, at least one band of at least one precinct comprises a plurality of TDC-selection groups, each comprising k encoded quantized wavelet coefficients, wherein the encoded quantized wavelet coefficients of one of the TDC-selection groups have been calculated using a sub-mode of one of the coding modes, wherein the data stream receiver is configured for extracting from the bit stream for one of the TDC-selection groups a bit shift parameter, which is an integer and which depends on the frame and the sub-mode of the respective TDC-selection group;

wherein the de-quantization processor is configured for calculating the quantization values for one of the TDC-selection groups of one of the frames, according to the formula $$T = \text{clamp}\left(q\,[p] + b\,[m'] - g\,[i,\,m] - X_{w[i,m]<r[p]},\,0,\,2^{Br} - 1\right),$$

wherein m' is the sub-mode of the TDC-selection group, wherein b is the bit shift parameter for the sub-mode of the TDC-selection group.

According to some embodiments, at least one band of at least one precinct comprises a plurality of TDC-selection groups, each comprising k encoded quantized wavelet coefficients, wherein the encoded quantized wavelet coefficients of one of the TDC-selection groups have been calculated using a sub-mode of one of the coding modes, wherein the data stream receiver is configured for extracting from the bit stream for one of the TDC-selection groups a bit shift parameter, which is an integer and which depends on the frame and the sub-mode of the respective TDC-selection group;

wherein the de-quantization processor is configured for calculating the de-quantized wavelet coefficients for one of the TDC-selection groups of one of the frames by calculating intermediate de-quantized wavelet coefficients depending on the quantization value for the band of the precinct of the respective TDC-selection group and by multiplying the intermediate de-quantized wavelet coefficients by $2^{b\,[m']}$, wherein m' is the sub-mode of the TDC-selection group, wherein b is the bit shift parameter for the sub-mode of the TDC-selection group.

According to some embodiments, the decoding processor is a variable length decoder or an entropy decoder.

In a further aspect, the disclosure provides a method for decoding a bit stream in order to reconstruct a video sequence comprising consecutive frames, the method comprising the steps of:

using a data stream receiver for extracting from the bit stream for each of the frames an encoded quantized wavelet-filtered frame comprising a plurality of bands, wherein each of the bands comprises a plurality of encoded quantized wavelet coefficients, wherein encoded quantized wavelet coefficients of the plurality of bands, which represent a group of rows of one of the frames, form a precinct, wherein the encoded quantized wavelet coefficients of the encoded quantized wavelet-filtered frame have been calculated using a coding mode of a plurality of coding modes, a plurality of tables, wherein each table of the plurality of tables relates to one coding mode of the plurality of coding modes, wherein each of the tables contains for each band of each precinct of the encoded quantized wavelet-filtered frame a gain value related to the coding mode to which the respective table relates;

for each band of each precinct the coding mode of the encoded quantized wavelet coefficients, and a quantization parameter for each of the precincts;

using a decoding processor for producing for each of the encoded quantized wavelet-filtered frames a decoded quantized wavelet-filtered frame, wherein each of the decoded quantized wavelet-filtered frames comprises a plurality of decoded quantized wavelet coefficients, which are calculated by decoding the encoded quantized wavelet coefficients of the respective encoded quantized wavelet-filtered frame;

using a de-quantization processor for producing for each of the decoded quantized wavelet-filtered frames a de-quantized wavelet-filtered frame, wherein each of the de-quantized wavelet-filtered frames comprises a plurality of de-quantized wavelet coefficients, wherein the de-quantization processor is configured to calculate each of the de-quantized wavelet coefficients depending on a quantization value, which is a non-negative integer, wherein the de-quantization processor calculates the quantization value for each of the decoded quantized wavelet coefficients depending on the quantization parameter for the precinct of the respective decoded quantized wavelet coefficient, depending on the coding mode of the precinct and the band of the encoded quantized wavelet coefficient corresponding to the respective decoded quantized wavelet coefficient, and depending on one of the gain values from the plurality of tables;

wherein the de-quantization processor retrieves the gain value for each of the decoded quantized wavelet coefficients, depending on the band of the respective decoded quantized wavelet coefficient from the table of the plurality of tables, which relates to the coding mode of the respective decoded quantized wavelet coefficient;

using an inverse wavelet transform processor for producing for each of the de-quantized wavelet-filtered frames a frame of the consecutive frames, wherein each of the frames comprises a plurality of pixels, wherein each of the pixels of the frame is calculated by applying an inverse time transform operation to the respective de-quantized wavelet-filtered frame and data calculated from one or more de-quantized wavelet-filtered frame preceding the respective de-quantized wavelet-filtered frame so as to produce an inverse time transformed de-quantized wavelet-filtered frame and by applying an inverse discrete wavelet transform to the inverse time transformed de-quantized wavelet-filtered frame, wherein the inverse time transform operation is applied in such way that each of the pixels is calculated by using a decoding mode of a plurality of decoding modes, wherein the decoding mode of one of the pixels correspond to the coding mode by which the encoded quantized wavelet coefficient corresponding to the one of the pixels has been calculated.

In a further aspect, the invention provides a computer program for, when running on a processor, executing the decoding method according to the disclosure.

The disclosure provides a coding scheme, which reduces the data rate of the bitstream, wherein the quality of the reconstructed video is enhanced, and wherein the computational effort is minimized at the encoder as well as at the decoder.

BRIEF DESCRIPTION OF THE DRAWINGS

Preferred embodiments of the invention are subsequently discussed with respect to the accompanying drawings, in which.

DETAILED DESCRIPTION OF THE INVENTION

Figure 1:
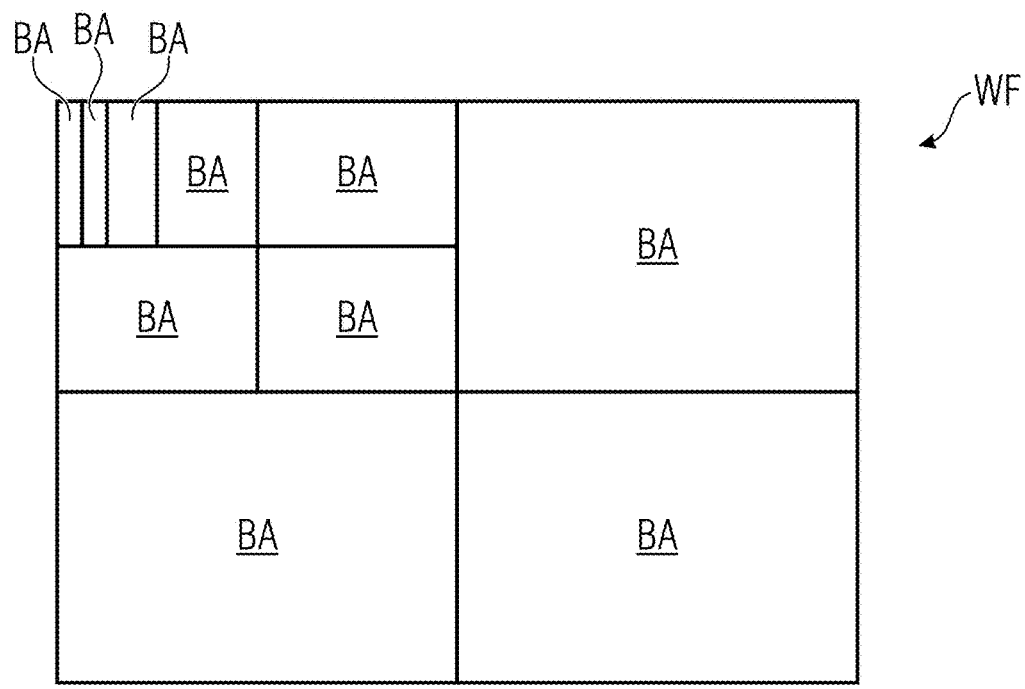
FIG. 1 illustrates an exemplary structure of a wavelet-filtered frame in a schematic view.

Equal or equivalent elements or elements with equal or equivalent functionality are denoted in the following description by equal or equivalent reference numerals.

In the following description, a plurality of details is set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 illustrates an exemplary structure of a wavelet-filtered frame WF in a schematic view. The disclosed compression method codes or sequences of frames by transforming an input signal using a discrete wavelet transform followed by a reduction of irrelevant portions using a quantization method. The bit rate may be further reduced by an appropriate encoding method.

The wavelet transform creates a wavelet-filtered frame WF, which comprises a plurality of bands BA, each consisting of wavelet coefficients, wherein a band BA maybe produced by a (recursive) application of a plurality of wavelet filters to a frame of an input signal. For each band BA, a plurality of horizontal and/or vertical filters may be applied to the input frame. It is also possible to combine horizontal and vertical filters. FIG. 1 shows a structure of an exemplary wavelet-filtered frame WF which has been produced using five horizontal filters and two vertical filters. Each of the bands BA represents a filtered version of the original frame.

Figure 2:
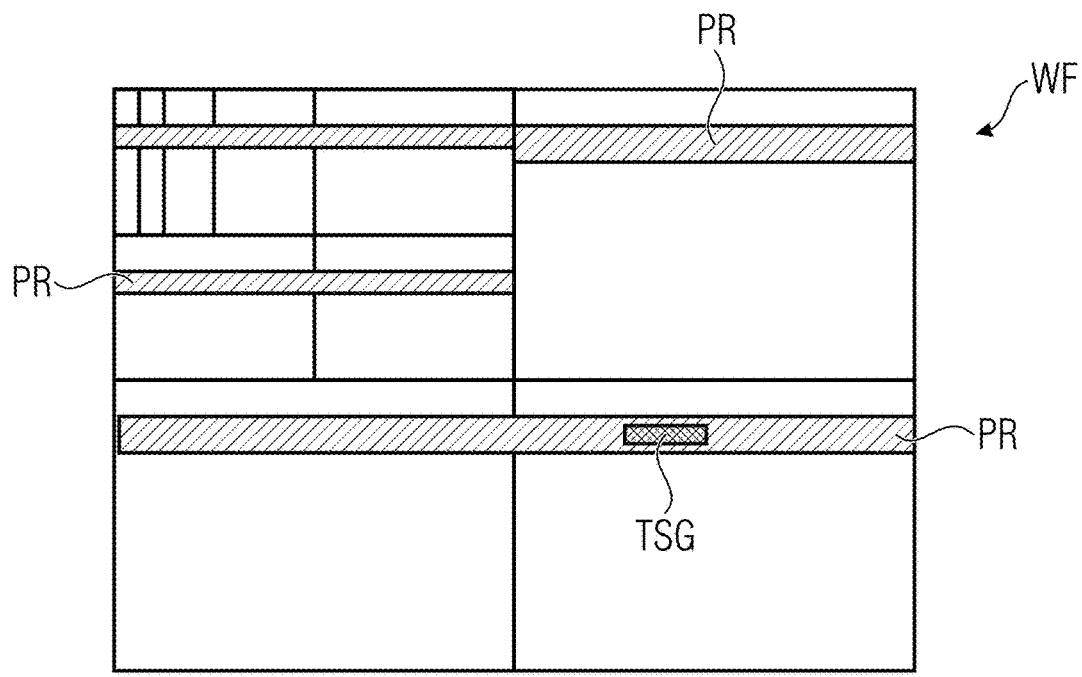
FIG. 2 illustrates an exemplary structure of a precinct of a wavelet-filtered frame in a schematic view.

FIG. 2 illustrates an exemplary structure of a precinct PR of a wavelet-filtered frame WF in a schematic view. Smaller bands BA are created by a larger number of applications of the filter. The bands BA may be split up in rows or groups of rows, so that the aggregation of the rows or groups of the different bands BA, which represent the same portion of the original frame form a precinct PR. A TDC-selection group TSG is a subset of a band BA of a precinct PR. It consists of k wavelet coefficients, where a value of k typically is 32.

With respect to the encoder 1, it has to be noted that a quantized wavelet-filtered frame QWF output by the quantization processor 4 has the same structure as the wavelet-filtered frame WF input to the quantization processor 4. This means that a quantized wavelet-filtered frame QWF comprises the same bands BA, precincts PR and TDC-selection groups TSG as the wavelet-filtered frame WF from which it has been derived. Moreover, an encoded quantized wavelet-filtered frame EQWF output by the encoding processor 6 has the same structure as the quantized wavelet-filtered frame QWF input to the encoding processor 6 so that an encoded quantized wavelet-filtered frame EQWF comprises the same bands BA, precincts PR and TDC-selection groups TSG as the wavelet-filtered frame WF from which it has been derived.

With respect to the decoder 11, it has to be noted that a decoded quantized wavelet-filtered frame DQWF output by the decoding processor 13 has the same structure as the encoded quantized wavelet-filtered frame EQWF input to the decoding processor. This means that a decoded quantized wavelet-filtered frame DQWF comprises the same bands BA, precincts PR and TDC-selection groups TSG as the encoded quantized wavelet-filtered frame EQWF from which it has been derived. Moreover, a de-quantized wavelet-filtered frame DWF output by the de-quantization processor 14 has the same structure as the decoded quantized wavelet-filtered frame DQWF input to the de-quantization processor 14 so that an de-quantized wavelet-filtered frame DWF comprises the same bands BA, precincts PR and TDC-selection groups TSG as the decoded quantized wavelet-filtered frame DQWF from which it has been derived.

The encoder and the decoder process each of the frames precinct after precinct from top to bottom.

Figure 3:
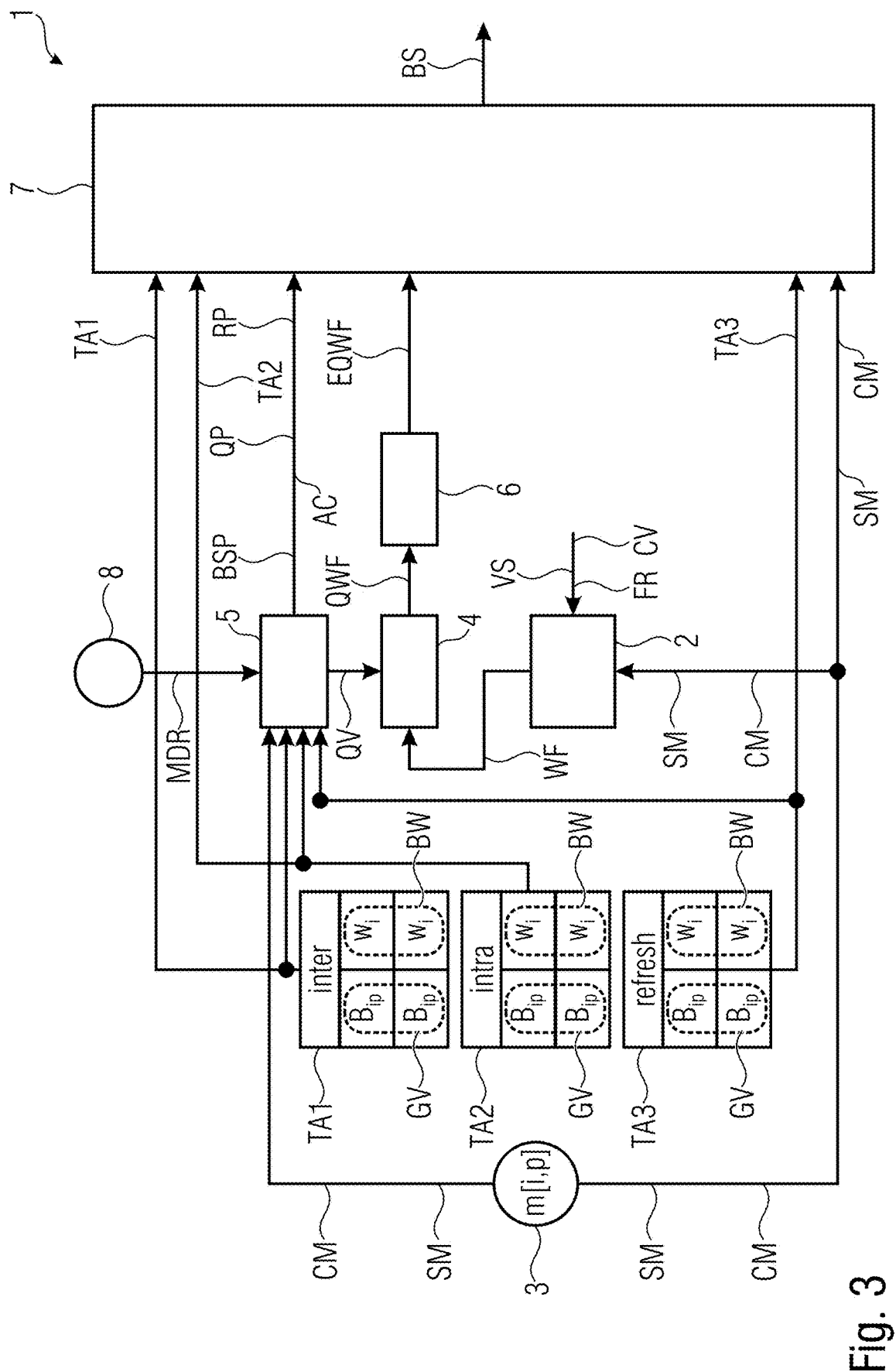
FIG. 3 illustrates an embodiment of an encoder according to the disclosure in a schematic view.

FIG. 3 illustrates an embodiment of an encoder 1 according to the disclosure in a schematic view. The encoder 1 for encoding a video sequence VS comprising consecutive frames FR into a bit stream BS comprises:

a wavelet transform processor 2 configured for producing for each of the frames FR a wavelet-filtered frame WF comprising a plurality of bands BA, wherein each of the bands BA comprises a plurality of wavelet coefficients, wherein wavelet coefficients of the plurality of wavelet coefficients of the plurality of bands, which represent a group of rows of one of the frames FR, form a precinct PR, wherein each of the wavelet coefficients of the wavelet-filtered frame is calculated by applying a discrete wavelet transform operation to the frame FR so as to produce an intermediate wavelet-filtered frame and by applying a time transform operation to the respective intermediate wavelet-filtered frame and on data calculated from one or more intermediate wavelet-filtered frames preceding the respective intermediate wavelet-filtered frame, wherein the time transform operation is applied in such way that each of the wavelet coefficients is calculated by using a coding mode of a plurality of coding modes;

a mode selecting processor 3 configured for providing for each band BA of each precinct PR of the wavelet coefficients the coding mode CM to be used for calculating the respective wavelet coefficient to the wavelet transform processor 2, wherein the mode selecting processor 3 is configured for selecting the coding mode CM depending on the band BA, to which the respective wavelet coefficient belongs, and depending on the precinct PR, to which the respective wavelet coefficient belongs;

a quantization processor 4 configured for producing for each of the wavelet-filtered frames WF a quantized wavelet-filtered frame QWF, wherein each of the quantized wavelet-filtered frames QWF comprises a plurality of quantized wavelet coefficients, wherein the quantization processor 4 is configured to calculate each of the quantized wavelet coefficients depending on a quantization value QV, which is a non-negative integer, wherein the quantization value QV depends on the coding mode CM of the respective wavelet coefficient;

a plurality of tables TA, wherein each table TA of the tables TA relates to one coding mode CM of the plurality of coding modes CM, wherein each of the tables TA contains for each band BA of each precinct PR of one of the frames FR a gain value GV related to the coding mode CM to which the respective table TA relates;

a rate allocator 5 configured for calculating the quantization value QV for each of the wavelet coefficients depending on a quantization parameter QP for the precinct PR of the respective wavelet coefficient, wherein the quantization parameter QP is determined iteratively by the rate allocator 5 in order to control a data rate of the bit stream BS, wherein the rate allocator 5 retrieves the gain value GV for each of the wavelet coefficients, depending on the band BA of the respective wavelet coefficient from the table TA of the plurality of tables TA, which relates to the coding mode CM of the respective wavelet coefficient, wherein the respective quantization value QV is calculated depending on the retrieved gain value GV;

an encoding processor 6 configured for producing for each of the quantized wavelet-filtered frames QWF an encoded quantized wavelet-filtered frame EQWF, wherein each of the encoded quantized wavelet-filtered frames EQWF comprises a plurality of encoded quantized wavelet coefficients;

a data stream producer 7 configured for embedding the encoded quantized wavelet-filtered frames EQWF, the plurality of tables TA, for each band BA of each precinct PR of the wavelet coefficients the coding mode CM, and the quantization parameter QP for each of the precincts PR into the bit stream BS.

According to some embodiments, the quantization processor 4 is a dead-zone quantization processor.

According to some embodiments, the quantization processor 4 is a uniform quantization processor.

According to some embodiments, at least one band BA of a precinct PR comprises a plurality of TDC-selection groups TSG, each comprising k wavelet coefficients, wherein the wavelet coefficients of one of the TDC-selection groups TSG calculated using a sub-mode SM of one of the coding modes CM which is determined by the mode selecting processor 3, wherein the data stream producer 7 is configured for embedding into the bit stream BS for one of the TDC-selection groups a bit shift parameter BSP, which is an integer and which depends on the sub-mode SM of the respective TDC-selection group TSG.

According to some embodiments, a value of k is 32.

According to some embodiments, the encoder 1 comprises a rate provider 8 configured for providing a maximum data rate MDR to the rate allocator 5, wherein the rate allocator 5 is configured to calculate the quantization values QV in such way that a data rate of the bitstream BS is lower or equal than the maximum data rate MDR.

According to some embodiments, each of the tables TA contain for each band BA of one of the frames FR a band weight BW related to the coding mode CM to which the respective table TA relates, wherein the rate allocator 5 is configured in such way, that, in case that the data rate is smaller than the maximum data rate MDR, additional data rate is, depending on the band weights BW retrieved from the table TA, allocated to one or more bands BA by decreasing the quantization values QV for the one or more bands BA.

According to some embodiments, the rate allocator 5 is configured for calculating the quantization value QV for each of the wavelet coefficients depending on a refinement parameter RP for the precinct PR of the respective wavelet coefficient, wherein the refinement parameter RP is determined iteratively by the rate allocator 5 in order to control a data rate of the bit stream BS, wherein the data stream producer 7 is configured for embedding the refinement parameter RP for each of the precincts PR into the bit stream BS.

According to some embodiments, the rate allocator 5 is configured for calculating the quantization value QV for each of the wavelet coefficients depending on a predefined amplitude control parameter AC for the respective frame FR, wherein the data stream producer 7 configured for embedding the amplitude control parameter AC for each of the frames FR into the bit stream BS.

According to some embodiments, the rate allocator 5 is configured for calculating the quantization values QV for a band BA of a precinct PR of one of the frames FR, according to the formula $$T = \text{clamp}\left(q[p] - g[i, m] - X_{w[i,m] < r[p]}, 0, 2^{Br} - 1\right),$$

wherein m is one of the coding mode CM, wherein T is the quantization value QV, wherein g [i, m] is the gain value GV for the i-th band BA retrieved from the table TA related to the respective coding mode CM, w [i, m] is the band weight BW for the i-th band BA retrieved from the table TA related to the respective coding mode CM, wherein Br is the amplitude control parameter AC for the frame FR, wherein X is an indicator function, which is 1, if the index is true, and 0, if the index is not true, wherein clamp is a function, which limits an output calculated from a first argument to an interval indicated by a second argument and a third argument, wherein q [p] is the quantization parameter QP for the p-th precinct PR, and r [p] is the refinement parameter RP for the p-th precinct PR.

According to some embodiments, at least one band BA of a precinct PR comprises a plurality of TDC-selection groups TSG, each comprising k wavelet coefficients, wherein the wavelet coefficients of one of the TDC-selection groups TSG calculated using a sub-mode SM of one of the coding modes CM which is determined by the mode selecting processor 3, wherein the data stream producer 7 is configured for embedding into the bit stream BS for one of the TDC-selection groups a bit shift parameter BSP, which is an integer and which depends on the sub-mode SM of the respective TDC-selection group TSG;

wherein the rate allocator 5 is configured for calculating the quantization values QV for one of the TDC-selection groups TSG of one of the frames FR, according to the formula $$T = \text{clamp}\,(q\,[p] + b\,[m'] - g\,[i, m] - X_{w[i,m] < r[p]}, 0, 2^{Br} - 1),$$

wherein m' is the sub-mode SM of the TDC-selection group TSG, wherein b is the bit shift parameter BSP for the sub-mode SM of the TDC-selection group TSG.

According to some embodiments, at least one band BA of a precinct PR comprises a plurality of TDC-selection groups TSG, each comprising k wavelet coefficients, wherein the wavelet coefficients of one of the TDC-selection groups TSG calculated using a sub-mode SM of one of the coding modes CM which is determined by the mode selecting processor 3, wherein the data stream producer 7 is configured for embedding into the bit stream BS for one of the TDC-selection groups a bit shift parameter BSP, which is an integer and which depends on the sub-mode SM of the respective TDC-selection group TSG;

wherein the quantization processor 4 is configured for calculating the quantized wavelet coefficients for one of the TDC-selection groups TSG of one of the frames FR by calculating intermediate quantized wavelet coefficients depending on the quantization value QV for the band BA of the precinct PR of the respective TDC-selection group TSG by dividing each of the wavelet coefficients by $2^{b\,[m']}$ and by quantizing the intermediate quantized wavelet coefficients depending on the quantization value QV for the band BA of the precinct PR of the respective TDC-selection group TSG, wherein m' is the sub-mode SM of the TDC-selection group TSG, wherein b is the bit shift parameter BSP for the sub-mode SM of the TDC-selection group TSG.

According to some embodiments, the encoding processor 6 is a variable length encoder or an entropy encoder.

In a further aspect, FIG. 3 illustrates an embodiment a method for encoding a video sequence comprising consecutive frames FR into a bit stream BS. The method comprises the steps of:

using a wavelet transform processor 2 for producing for each of the frames FR a wavelet-filtered frame WF comprising a plurality of bands BA, wherein each of the bands BA comprises a plurality of wavelet coefficients, wherein wavelet coefficients of the plurality of wavelet coefficients of the plurality of bands BA, which represent a group of rows of one of the frames FR, form a precinct PR, wherein each of the wavelet coefficients of the wavelet-filtered frame WF is calculated by applying a discrete wavelet transform operation to the frame FR so as to produce an intermediate wavelet-filtered frame and by applying a time transform operation to the respective intermediate wavelet-filtered frame and on data calculated from one or more intermediate wavelet-filtered frames preceding the respective intermediate wavelet-filtered frame, wherein the time transform operation is applied in such way that each of the wavelet coefficients is calculated by using a coding mode CM of a plurality of coding modes CM;

using a mode selecting processor 3 for providing for each band BA of each precinct PR of the wavelet coefficients the coding mode CM to be used for calculating the respective wavelet coefficient to the wavelet transform processor 2, wherein the mode selecting processor 3 is used for selecting the coding mode CM depending on the band BA, to which the respective wavelet coefficient belongs, and depending on the precinct PR, to which the respective wavelet coefficient belongs;

using a quantization processor 4 for producing for each of the wavelet-filtered frames WF a quantized wavelet-filtered frame QWF, wherein each of the quantized wavelet-filtered frames QWF comprises a plurality of quantized wavelet coefficients, wherein the quantization processor 4 is used to calculate each of the quantized wavelet coefficients depending on a quantization value QV, which is a non-negative integer, wherein the quantization value QV depends on the coding mode CM of the respective wavelet coefficient;

providing a plurality of tables TA, wherein each table TA of the tables TA relates to one coding mode CM of the plurality of coding modes CM, wherein each of the tables TA contains for each band BA of one of the frames FR a gain value GV related to the coding mode CM to which the respective table TA relates;

using a rate allocator 5 for calculating the quantization value for each of the wavelet coefficients depending on a quantization parameter QP for the precinct PR of the respective wavelet coefficient, wherein the quantization parameter QP is determined iteratively by the rate allocator 5 in order to control a data rate of the bit stream BS, wherein the rate allocator 5 retrieves the gain value GV for each of the wavelet coefficients, depending on the band BA of the respective wavelet coefficient from the table TA of the plurality of tables TA, which relates to the coding mode CM of the respective wavelet coefficient, wherein the respective quantization value QV is calculated depending on the retrieved gain value GV;

using an encoding processor 6 for producing for each of the quantized wavelet-filtered frames QWF an encoded quantized wavelet-filtered frame EQWF, wherein each of the encoded quantized wavelet-filtered frames EQWF comprises a plurality of encoded quantized wavelet coefficients;

using a data stream producer 7 configured for embedding the encoded quantized wavelet-filtered frames EQWF, the plurality of tables TA, for each band BA of each precinct PR of the wavelet coefficients the coding mode CM, and the quantization parameter QP for each of the precincts PR into the bit stream BS.

In a further aspect, FIG. 3 illustrates a computer program for, when running on a processor, executing an encoding method according to the disclosure.

The compression of a video sequence comprises a transform operation, followed by a quantization operation and an encoding operation.

The transform operation comprises a wavelet-transform operation followed by a time transform operation, wherein the latter exploits differences of consecutive frames of the video sequence. The transform operation is followed by a quantization step. Finally, a variable-length encoding operation may be used to construct the final bitstream.

During the quantization step, it has to be considered, that not all of the bands BA of the precincts PR contribute to the quality of a reconstructed frame FR in the same way. Thus, the quantization is done differently for different bands BA of different precincts PR.

The time transform is executed with different coding methods for different bands BA of each precinct PR of the frame. At a possible first coding method (sometimes referred to as inter coding method), a difference between a portion of a current frame and the corresponding portion of data derived from a preceding frame is calculated. Typically, the first method is used in case that the difference of the portions is low. In case that the difference is high, typically a second possible method (often referred to as intra coding method) is used, in which the time transform is switched off due to a low similarity of the portions. In a possible third method (which may be called refresh coding method) the time transform is switched off in order to provide a complete reference frame to the decoder, which is needed by the decoder in order to perform an inverse time transform. It has to be noted, that the different coding methods affect the quality of a reconstructed frame in different ways. Thus, the quantization is done differently for different coding methods. Typically, the coding method is selected in such way, that the bandwidth of the resulting bit stream is minimized unless regular refresh is needed which overrides this decision.

During quantization, dividing the wavelet coefficients by 2T can be performed very efficiently in a binary numeral system, which is usually used in video encoders and decoders. Other quantization schemes depending on a parameter T may also be used, such as data-dependent uniform quantization. In order to optimize the quantization step, a plurality of coding modes CM for the calculation of the exponent T, which is the quantization value QV, is used, wherein the coding mode CM for a portion of a frame FR is chosen depending on the coding method of that portion of that frame FR. Each of the coding modes CM is executed based on one of a plurality of tables TA. Thus, each of the tables TA is a coding mode dependent table TA.

The quantization value QV may be calculated for each of the wavelet coefficients individually. However, it is more efficient to calculate the quantization value QV for groups of wavelet coefficients, for example for all wavelet coefficients of a band BA of a precinct PR. Optionally, the quantization value QV, which is calculated for a band BA of a precinct PR, may be fine-tuned for the wavelet coefficients of a subset of a band BA of a precinct PR, wherein the subset may be a TDC selection group.

Each of the tables TA is related to one of the coding modes CM. Each of the tables TA comprises gains for each band BA for the respective coding mode CM. Furthermore, each of the tables TA may comprise band weights for each of the bands BA for the respective coding mode CM.

In the example of FIG. 3, three tables TA are provided, wherein the table TA1 is related to a first coding mode CM, which is used for the inter coding method, wherein the table TA2 is related to a second coding mode CM, which is used for the intra coding mode, and wherein the third table TA3 is related to a third coding mode CM, which is used for the refresh coding mode. This means, that for each of the coding modes CM and for each of the coding methods a specific table is provided.

In other embodiments, one of the coding modes CM is used for a plurality of the coding methods. For example, a first table for a first coding mode CM could be used for the inter coding method and for the intra method, whereas a second table for a second coding mode CM could be used for the refresh mode.

The coding mode CM is embedded to the bit stream BS for each band BA of each precinct PR.

Selecting the quantization value QV in one step for all bands BA may not be granular enough to reach a desired maximum data rate as selected by the rate provider 8. In addition, the rate allocator 5 may provide additional data rate to selected bands BA if additional data rate is available, though this additional data rate is too small to decrease the quantization value QV by 1. The order in which bands BA of one precinct PR of the wavelet coefficients may receive such additional data rate is selected by the band weights BW which may be part of the tables TA, and the number of bands BA that receive such additional data rate for a precinct is denoted the refinement parameter RP, which may be selected by the rate allocator 5 and which may be embedded into the bit stream BS by the data stream producer 7.

In order to optimize the quantization values QV, the quantization value QV for a TDC-selection group of a band BA of a precinct PR may be calculated using a sub-mode SM of the coding mode CM of the respective band BA of the precinct PR: The sub-mode SM may use a bit shift operation, which allows to optimize the calculated quantization value QV for the respective TDC-selection group TSG. The bit shift operation is represented in above formula by the term b [m']. In other embodiments, this bit shift can be applied by dividing the wavelet coefficients within one of the TDC-selection groups by the value $2^{b\,[m']}$ prior performing quantization, wherein m' denotes the sub-mode SM of the respective TDC-selection group.

In particular, sub-modes SM may be used in cases, in which one coding mode CM is used for more than one coding method. For example, if a specific coding mode CM is used for a first coding method, for example the intra coding method, and for a second coding method, for example the inter coding method, a first sub-mode SM of the specific coding mode CM can be used for the first coding method, for example for the intra coding method, and a second sub-mode SM of the specific coding mode CM can be used for the second coding method, for example for the inter coding mode.

The sub-mode SM may be embedded to the bit stream BS for those subsets, which are processed using a sub-mode SM.

Figure 4:
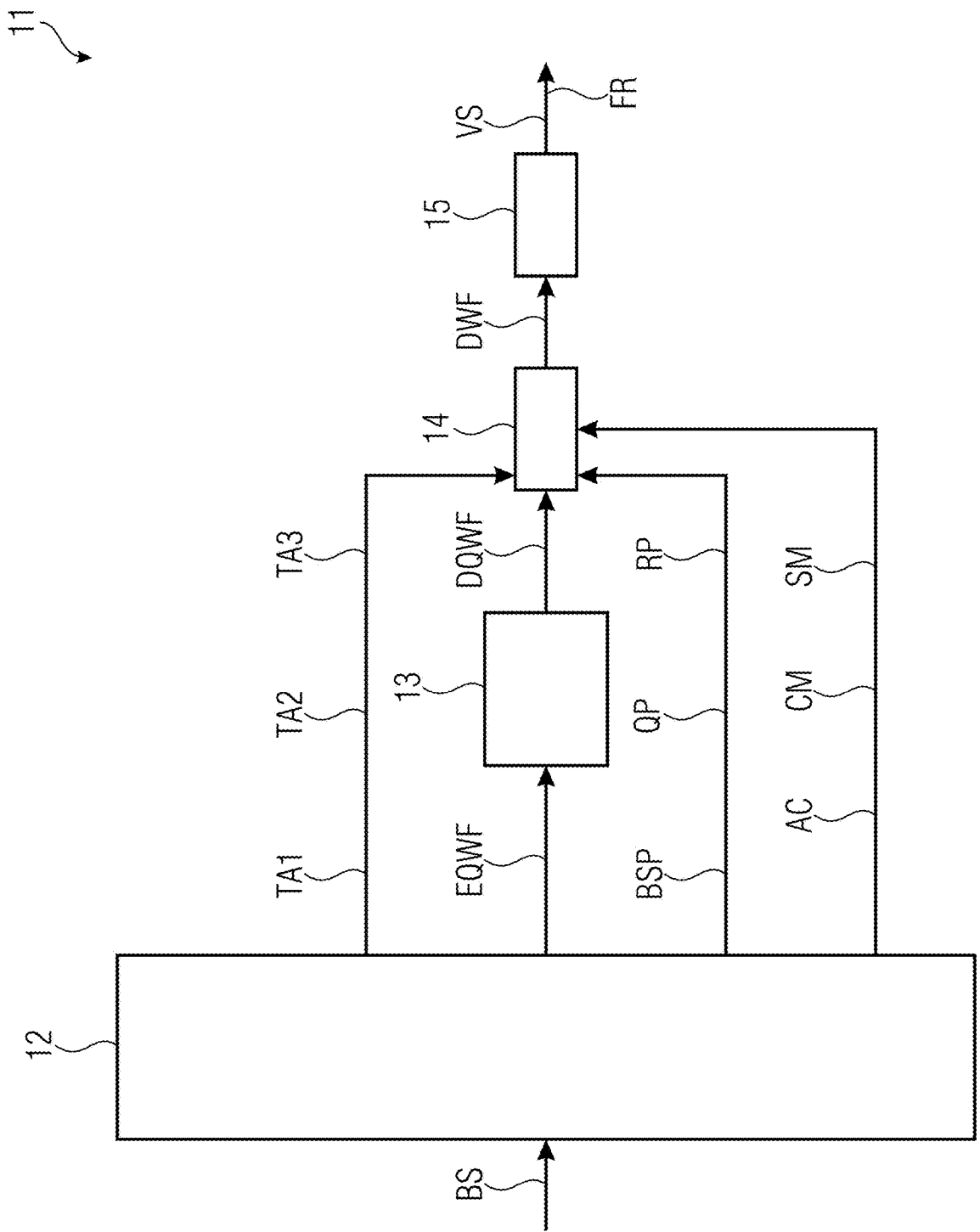
FIG. 4 illustrates an embodiment of a decoder according to the disclosure in a schematic view.

FIG. 4 illustrates an embodiment of a decoder 11 according to the disclosure in a schematic view. The decoder for decoding a bit stream BS in order to reconstruct a video sequence VS comprising consecutive frames FR comprises;

an encoded quantized wavelet-filtered frame EQWF comprising a plurality of bands BA, wherein each of the bands BA comprises a plurality of encoded quantized wavelet coefficients, wherein encoded quantized wavelet coefficients of the plurality of bands BA, which represent a group of rows of one of the frames FR, form a precinct PR, wherein the encoded quantized wavelet coefficients of the encoded quantized wavelet-filtered frame EQWF have been calculated using a coding mode CM of a plurality of coding modes CM, a plurality of tables TA, wherein each table TA of the plurality of tables TA relates to one coding mode CM of the plurality of coding modes CM, wherein each of the tables TA contains for each band BA of the encoded quantized wavelet-filtered frame EQWF a gain value GV related to the coding mode CM to which the respective table TA relates;

for each band BA of each precinct PR the coding mode CM of the encoded quantized wavelet coefficients, and a quantization parameter QP for each of the precincts PR;

a decoding processor 13 configured for producing for each of the encoded quantized wavelet-filtered frames EQWF a decoded quantized wavelet-filtered frame DQWF, wherein each of the decoded quantized wavelet-filtered frames DQWF comprises a plurality of decoded quantized wavelet coefficients, which are calculated by decoding the encoded quantized wavelet coefficients of the respective encoded quantized wavelet-filtered frame EQWF;

a de-quantization processor 14 configured for producing for each of the decoded quantized wavelet-filtered frames DQWF a de-quantized wavelet-filtered frame DWF, wherein each of the de-quantized wavelet-filtered frames DWF comprises a plurality of de-quantized wavelet coefficients, wherein the de-quantization processor 14 is configured to calculate each of the de-quantized wavelet coefficients depending on a quantization value QV, which is a non-negative integer;

wherein the de-quantization processor 14 is configured for calculating the quantization value QV for each of the decoded quantized wavelet coefficients depending on the quantization parameter QP for the precinct PR of the respective decoded quantized wavelet coefficient, depending on the coding mode CM of the precinct PR and the band BA of the encoded quantized wavelet coefficient corresponding to the respective decoded quantized wavelet coefficient, and depending on one of the gain values GV from the plurality of tables TA;

wherein the de-quantization processor 14 is configured for retrieving the gain value GV for each of the decoded quantized wavelet coefficients, depending on the band BA of the respective decoded quantized wavelet coefficient from the table TA of the plurality of tables TA, which relates to the coding mode CM of the respective decoded quantized wavelet coefficient;

an inverse wavelet transform processor 15 configured for producing for each of the de-quantized wavelet-filtered frames DWF a frame FR of the consecutive frames FR, wherein each of the frames FR comprises a plurality of pixels, wherein each of the pixels of the frame FR is calculated by applying an inverse time transform operation to the respective de-quantized wavelet-filtered frame DWF and on data calculated from one or more de-quantized wavelet-filtered frame DWF preceding the respective de-quantized wavelet-filtered frame DWF so as to produce an inverse time transformed de-quantized wavelet-filtered frame and by applying an inverse discrete wavelet transform to the inverse time transformed de-quantized wavelet-filtered frame, wherein the inverse time transform operation is applied in such way that each of the pixels is calculated by using a decoding mode of a plurality of decoding modes, wherein the decoding mode of one of the pixels correspond to the coding mode CM by which the encoded quantized wavelet coefficient corresponding to the one of the pixels has been calculated.

According to some embodiments, the de-quantization processor 14 is a dead-zone de-quantization processor.

According to some embodiments, the de-quantization processor 14 is a uniform de-quantization processor.

According to some embodiments, wherein the de-quantization processor 14 is configured to calculate each of the de-quantized wavelet coefficients by multiplying the respective decoded quantized wavelet coefficient by $2^T$, wherein T is the quantization value QV.

According to some embodiments, at least one band BA of at least one precinct PR comprises a plurality of TDC-selection groups TSG, each comprising k encoded quantized wavelet coefficients, wherein the encoded quantized wavelet coefficients of one of the TDC-selection groups TSG have been calculated using a sub-mode SM of one of the coding modes CM, wherein the data stream receiver 12 is configured for extracting from the bit stream BS for one of the TDC-selection groups TSG a bit shift parameter BSP, which is an integer and which depends on the frame FR and the sub-mode SM of the respective TDC-selection group TSG.

According to some embodiments, a value of k is 32.

According to some embodiments, each of the tables TA contain for each band BA of one of the encoded quantized wavelet-filtered frame EQWF a band weight BW related to the coding mode CM to which the respective table TA relates.

According to some embodiments, the data stream receiver 12 is configured for extracting from the bit stream BS for each of the frames FR a refinement parameter RP for each of the precincts PR, wherein the de-quantization processor 14 is configured for calculating the quantization values QV for each of the precincts PR depending on the refinement parameter RP for the respective precinct PR.

According to some embodiments, the data stream receiver 12 is configured for extracting from the bit stream BS for each of the frames FR an amplitude control parameter AC, wherein the de-quantization processor 14 is configured for calculating the quantization values QV for each of the precincts PR depending on the amplitude control parameter AC for the respective frame FR.

According to some embodiments, the de-quantization processor 14 is configured for calculating the quantization values QV for a band BA of a precinct PR of one of the frames FR according to the formula $$T = \text{clamp}\left(q\,[p] - g\,[i, m] - X_{w[i,m]<r[p]}, 0, 2^{Br} - 1\right),$$

wherein m is the coding mode CM, wherein T is the quantization value QV, wherein g [i, m] is the gain value for the i-th band BA retrieved from the table TA related to the respective coding mode CM, w [i, m] is the band weight BW for the i-th band BA retrieved from the table TA related to the respective coding mode CM, wherein Br is the amplitude control parameter AC for the frame FR, wherein X is an indicator function, which is 1, if the index is true, and 0, if the index is not true, wherein clamp is a function, which limits an output calculated from a first argument to an interval indicated by a second argument and a third argument, wherein q [p] is the quantization parameter QP for the p-th precinct PR, and r [p] is the refinement parameter RP for the p-th precinct PR.

According to some embodiments, at least one band BA of at least one precinct PR comprises a plurality of TDC-selection groups TSG, each comprising k encoded quantized wavelet coefficients, wherein the encoded quantized wavelet coefficients of one of the TDC-selection groups TSG have been calculated using a sub-mode SM of one of the coding modes CM, wherein the data stream receiver 12 is configured for extracting from the bit stream BS for one of the TDC-selection groups a bit shift parameter BSP, which is an integer and which depends on the frame FR and the sub-mode SM of the respective TDC-selection group TSG;

wherein the de-quantization processor 14 is configured for calculating the quantization values QV for one of the TDC-selection groups TSG of one of the frames FR, according to the formula $$T = \mathrm{clamp}\left(q\,[p] + b\,[m'] - g\,[i,\,m] - X_{w[i,m]<r[p]},\,0,\,2^{Br} - 1\right),$$

wherein m' is the sub-mode SM of the TDC-selection group TSG, wherein b is the bit shift parameter BSP for the sub-mode SM of the TDC-selection group TSG.

According to some embodiments, the de-quantization processor 14 is a uniform de-quantization processor, wherein at least one band BA of at least one precinct PR comprises a plurality of TDC-selection groups TSG, each comprising k encoded quantized wavelet coefficients, wherein the encoded quantized wavelet coefficients of one of the TDC-selection groups TSG have been calculated using a sub-mode SM of one of the coding modes CM, wherein the data stream receiver 12 is configured for extracting from the bit stream BS for one of the TDC-selection groups a bit shift parameter BSP, which is an integer and which depends on the frame FR and the sub-mode SM of the respective TDC-selection group TSG;

wherein the de-quantization processor 14 is configured for calculating the de-quantized wavelet coefficients for one of the TDC-selection groups TSG of one of the frames FR by calculating intermediate de-quantized wavelet coefficients depending on the quantization value QV for the band BA of the precinct PR of the respective TDC-selection group TSG and by multiplying the intermediate de-quantized wavelet coefficients by $2^{b\,[m']}$, wherein m' is the sub-mode SM of the TDC-selection group (TSG, wherein b is the bit shift parameter BSP of the sub-mode SM of the TDC-selection group TSG.

According to some embodiments, the decoding processor 13 is a variable length decoder or an entropy decoder.

In a further aspect, FIG. 4 illustrates an embodiment of a method for decoding a bit stream BS in order to reconstruct a video sequence VS comprising consecutive frames FR. The method comprises the steps of:

using a data stream receiver 12 for extracting from the bit stream BS for each of the frames FR
an encoded quantized wavelet-filtered frame EQWF comprising a plurality of bands BA, wherein each of the bands BA comprises a plurality of encoded quantized wavelet coefficients, wherein encoded quantized wavelet coefficients of the plurality of bands BA, which represent a group of rows of one of the frames FR, form a precinct PR, wherein the encoded quantized wavelet coefficients of the encoded quantized wavelet-filtered frame EQWF have been calculated using a coding mode CM of a plurality of coding modes CM,
a plurality of tables TA, wherein each table TA of the plurality of tables TA relates to one coding mode CM of the plurality of coding modes CM, wherein each of the tables TA contains for each band BA of each precinct PR of the encoded quantized wavelet-filtered frame EQWF a gain value GV related to the coding mode CM to which the respective table TA relates;
for each band BA of each precinct PR the coding mode CM of the encoded quantized wavelet coefficients, and
a quantization parameter QP for each of the precincts PR;

using a decoding processor 13 for producing for each of the encoded quantized wavelet-filtered frames EQWF a decoded quantized wavelet-filtered frame DQWF, wherein each of the decoded quantized wavelet-filtered frames DQWF comprises a plurality of decoded quantized wavelet coefficients, which are calculated by decoding the encoded quantized wavelet coefficients of the respective encoded quantized wavelet-filtered frame EQWF;

using a de-quantization processor 14 for producing for each of the decoded quantized wavelet-filtered frames DQWF a de-quantized wavelet-filtered frame DWF, wherein each of the de-quantized wavelet-filtered frames DWF comprises a plurality of de-quantized wavelet coefficients, wherein the de-quantization processor 14 is configured to calculate each of the de-quantized wavelet coefficients depending on a quantization value QV, which is a non-negative integer, wherein the de-quantization processor 14 calculates the quantization value QV for each of the decoded quantized wavelet coefficients depending on the quantization parameter QP for the precinct PR of the respective decoded quantized wavelet coefficient, depending on the coding mode CM of the precinct PR and the band BA of the encoded quantized wavelet coefficient corresponding to the respective decoded quantized wavelet coefficient, and depending on one of the gain values GV from the plurality of tables TA;

wherein the de-quantization processor 14 retrieves the gain value GV for each of the decoded quantized wavelet coefficients, depending on the band BA of the respective decoded quantized wavelet coefficient from the table TA of the plurality of tables TA, which relates to the coding mode CM of the respective decoded quantized wavelet coefficient;

using an inverse wavelet transform processor 15 for producing for each of the de-quantized wavelet-filtered frames DWF a frame FR of the consecutive frames FR, wherein each of the frames FR comprises a plurality of pixels, wherein each of the pixels of the frame is calculated by applying an inverse time transform operation to the respective de-quantized wavelet-filtered frame DWF and data calculated from one or more de-quantized wavelet-filtered frame DWF preceding the respective de-quantized wavelet-filtered frame DWF so as to produce an inverse time transformed de-quantized wavelet-filtered frame and by applying an inverse discrete wavelet transform to the inverse time transformed de-quantized wavelet-filtered frame, wherein the inverse time transform operation is applied in such way that each of the pixels is calculated by using a decoding mode of a plurality of decoding modes, wherein the decoding mode of one of the pixels correspond to the coding mode CM by which the encoded quantized wavelet coefficient corresponding to the one of the pixels has been calculated.

In a further aspect, FIG. 4 illustrates a computer program for, when running on a processor, executing a decoding method according to the disclosure.

The decoder 11 is configured to reconstruct the video sequence by processing the bitstream BS, which may be produced by an encoder 1 according to the disclosure or by a method according to the disclosure respectively. For this purpose, the encoder 1 execute the steps of the data stream producer 7 of the encoder 1, of the encoding processor 6 of the encoder 1, of the quantization processor 4 of the encoder 1 and the wavelet transform processor 2 of the encoder 1 in reverse.

The disclosure provides a coding scheme, which reduces the data rate of the bitstream BS, wherein the quality of the reconstructed video is enhanced, and wherein the computational effort is minimized at the encoder 1 as well as at the decoder 11.

In this disclosure, the term processor refers to an electronic device configured for a specific task. A processor may comprise hardware or a combination of hardware and software. Different processors may share hardware components and/or software components.

Depending on certain implementation requirements, embodiments of the inventive device and system can be implemented in hardware and/or in software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that one or more or all of the functionalities of the inventive device or system is performed.

In some embodiments, a programmable logic device (for example a field programmable gate array) may be used to perform one or more or all of the functionalities of the devices and systems described herein. In some embodiments, a field programmable gate array may cooperate with a microprocessor in order to perform one or more or all of the functionalities of the devices and systems described herein.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the inventive method can be implemented using an apparatus comprising hardware and/or software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that the respective method is performed.

Depending on certain implementation requirements, embodiments of the inventive method can be implemented using an apparatus comprising hardware and/or software.

Some or all of the method steps may be executed by (or using) a hardware apparatus, like a microprocessor, a programmable computer or an electronic circuit. Some one or more of the most important method steps may be executed by such an apparatus.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, which is stored on a machine readable carrier or a non-transitory storage medium.

A further embodiment comprises a processing means, for example a computer, or a programmable logic device, in particular a processor comprising hardware, configured or adapted to perform one of the methods described herein.

A further embodiment comprises a computer having installed thereon the computer program for performing one of the methods described herein.

Generally, the methods are advantageously performed by any apparatus comprising hardware and or software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCE SIGNS

1 encoder
2 wavelet transform processor
3 mode selecting processor
4 quantization processor
5 rate allocator
6 encoding processor
7 data stream producer
8 rate provider
11 decoder
12 data stream receiver
13 decoding processor
14 de-quantization processor
15 inverse wavelet transform processor
WF wavelet-filtered frame
BA band
PR precinct
TSG TDC-selection group
BS bit stream
VS video sequence
FR frame
CM coding mode
GV gain value
QWF quantized wavelet-filtered frame
QV quantization value
TA table
QP quantization parameter
RP refinement parameter
AC amplitude control parameter
EQWF encoded quantized wavelet-filtered frame
MDR maximum data rate
BW band weight
SM sub-mode
BSP bit shift parameter DQWF decoded quantized wavelet-filtered frame
DWF de-quantized wavelet-filtered frame

REFERENCES

[1] ISO/IEC 11172, 1991 Dec. 6
[2] ISO/IEC 10918, 1992 Aug. 30
[3] H.261, 1993 Mar. 12
[4] H.264, 2004 Aug. 17
[5] H.266, 2013 Jun. 7
[6] H.267, 2017 Jun. 6
[7] ISO/IEC 2122-1, 2019 May 1

The invention claimed is:

1. A decoder for decoding a bit stream in order to reconstruct a video sequence comprising consecutive frames, the decoder comprising:
a data stream receiver configured for extracting from the bit stream for each of the frames
an encoded quantized wavelet-filtered frame comprising a plurality of bands, wherein each of the bands comprises a plurality of encoded quantized wavelet coefficients, wherein encoded quantized wavelet coefficients of the plurality of bands, which represent a group of rows of one of the frames, form a precinct, wherein the encoded quantized wavelet coefficients of the encoded quantized wavelet-filtered frame have been calculated using a coding mode of a plurality of coding modes,
a plurality of tables, wherein each table of the plurality of tables relates to one coding mode of the plurality of coding modes, wherein each of the tables contains for each band of the encoded quantized wavelet-filtered frame a gain value related to the coding mode to which the respective table relates;
for each band of each precinct the coding mode of the encoded quantized wavelet coefficients, and
a quantization parameter for each of the precincts;
a decoding processor configured for producing for each of the encoded quantized wavelet-filtered frames a decoded quantized wavelet-filtered frame, wherein each of the decoded quantized wavelet-filtered frames comprises a plurality of decoded quantized wavelet coefficients, which are calculated by decoding the encoded quantized wavelet coefficients of the respective encoded quantized wavelet-filtered frame;
a de-quantization processor configured for producing for each of the decoded quantized wavelet-filtered frames a de-quantized wavelet-filtered frame, wherein each of the de-quantized wavelet-filtered frames comprises a plurality of de-quantized wavelet coefficients, wherein the de-quantization processor is configured to calculate each of the de-quantized wavelet coefficients depending on a quantization value, which is a non-negative integer;
wherein the de-quantization processor is configured for calculating the quantization value for each of the decoded quantized wavelet coefficients depending on the quantization parameter for the precinct of the respective decoded quantized wavelet coefficient, depending on the coding mode of the precinct and the band of the encoded quantized wavelet coefficient corresponding to the respective decoded quantized wavelet coefficient, and depending on one of the gain values from the plurality of tables;
wherein the de-quantization processor is configured for retrieving the gain value for each of the decoded quantized wavelet coefficients, depending on the band of the respective decoded quantized wavelet coefficient from the table of the plurality of tables, which relates to the coding mode of the respective decoded quantized wavelet coefficient;
an inverse wavelet transform processor configured for producing for each of the de-quantized wavelet-filtered frames a frame of the consecutive frames, wherein each of the frames comprises a plurality of pixels, wherein each of the pixels of the frame is calculated by applying an inverse time transform operation to the respective de-quantized wavelet-filtered frame and on data calculated from one or more de-quantized wavelet-filtered frame preceding the respective de-quantized wavelet-filtered frame so as to produce an inverse time transformed de-quantized wavelet-filtered frame and by applying an inverse discrete wavelet transform to the inverse time transformed de-quantized wavelet-filtered frame, wherein the inverse time transform operation is applied in such way that each of the pixels is calculated by using a decoding mode of a plurality of decoding modes, wherein the decoding mode of one of the pixels correspond to the coding mode by which the encoded quantized wavelet coefficient corresponding to the one of the pixels has been calculated.

2. The decoder according to claim 1, wherein the de-quantization processor is a dead-zone de-quantization processor.

3. The decoder according to claim 1, wherein the de-quantization processor is a uniform de-quantization processor.

4. The decoder according to claim 1, wherein the de-quantization processor is configured to calculate each of the de-quantized wavelet coefficients by multiplying the respective decoded quantized wavelet coefficient by 2T, wherein T is the quantization value.

5. The decoder according to claim 1, wherein at least one band of at least one precinct comprises a plurality of time differential coding (TDC)-selection groups, each comprising k encoded quantized wavelet coefficients, wherein the encoded quantized wavelet coefficients of one of the TDC-selection groups have been calculated using a sub-mode of one of the coding modes, wherein the data stream receiver is configured for extracting from the bit stream for one of the TDC-selection groups a bit shift parameter, which is an integer and which depends on the frame and the sub-mode of the respective TDC-selection group.

6. The decoder according to claim 5, wherein a value of k is 32.

7. The decoder according to claim 1, wherein each of the tables contain for each band of one of the encoded quantized wavelet-filtered frame a band weight related to the coding mode to which the respective table relates.

8. The decoder according to claim 7, wherein the data stream receiver is configured for extracting from the bit stream for each of the frames a refinement parameter for each of the precincts, wherein the de-quantization processor is configured for calculating the quantization values for each of the precincts depending on the refinement parameter for the respective precinct.

9. The decoder according to claim 8, wherein the data stream receiver is configured for extracting from the bit stream for each of the frames an amplitude control parameter, wherein the de-quantization processor is configured for calculating the quantization values for each of the precincts depending on the amplitude control parameter for the respective frame.

10. The decoder according to claim 9, wherein the de-quantization processor is configured for calculating the quantization values for a band of a precinct of one of the frames according to the formula $$T = \text{clamp}\left(q\,[p] - g\,[i, m] - X_{w[i,m]<r[p]}, 0, 2^{Br} - 1\right),$$

wherein m is the coding mode, wherein T is the quantization value, wherein g [i, m] is the gain value for the i-th band retrieved from the table related to the respective coding mode, w [i, m] is the band weight for the i-th band retrieved from the table related to the respective coding mode, wherein Br is the amplitude control parameter for the frame, wherein X is an indicator function, which is 1, if the index is true, and 0, if the index is not true, wherein clamp is a function, which limits an output calculated from a first argument to an interval indicated by a second argument and a third argument, wherein q [p] is the quantization parameter for the p-th precinct, and r [p] is the refinement parameter for the p-th precinct.

11. The decoder according to claim 10, wherein at least one band of at least one precinct comprises a plurality of time differential coding (TDC)-selection groups, each comprising k encoded quantized wavelet coefficients, wherein the encoded quantized wavelet coefficients of one of the TDC-selection groups have been calculated using a sub-mode of one of the coding modes, wherein the data stream receiver is configured for extracting from the bit stream for one of the TDC-selection groups a bit shift parameter, which is an integer and which depends on the frame and the sub-mode of the respective TDC-selection group;

wherein the de-quantization processor is configured for calculating the quantization values for one of the TDC-selection groups of one of the frames, according to the formula $$T = \text{clamp}\left(q\,[p] + b\,[m'] - g\,[i, m] - X_{w[i,m]<r[p]}, 0, 2^{Br} - 1\right),$$

wherein m' is the sub-mode of the TDC-selection group, wherein b is the bit shift parameter for the sub-mode of the TDC-selection group.

12. The decoder according to claim 1, wherein the de-quantization processor is a uniform de-quantization processor, wherein at least one band of at least one precinct comprises a plurality of time differential coding (TDC)-selection groups, each comprising k encoded quantized wavelet coefficients, wherein the encoded quantized wavelet coefficients of one of the TDC-selection groups have been calculated using a sub-mode of one of the coding modes, wherein the data stream receiver is configured for extracting from the bit stream for one of the TDC-selection groups a bit shift parameter, which is an integer and which depends on the frame and the sub-mode of the respective TDC-selection group;

wherein the de-quantization processor is configured for calculating the de-quantized wavelet coefficients for one of the TDC-selection groups of one of the frames by calculating intermediate de-quantized wavelet coefficients depending on the quantization value for the band of the precinct of the respective TDC-selection group and by multiplying the intermediate de-quantized wavelet coefficients by $2^{b\,[m']}$, wherein m' is the sub-mode of the TDC-selection group, wherein b is the bit shift parameter for the sub-mode of the TDC-selection group.

13. The decoder according to claim 1, wherein the decoding processor is a variable length decoder or an entropy decoder.

14. A method for decoding a bit stream in order to reconstruct a video sequence VS comprising consecutive frames, the method comprising the steps of:

using a data stream receiver for extracting from the bit stream for each of the frames FR
    an encoded quantized wavelet-filtered frame comprising a plurality of bands, wherein each of the bands comprises a plurality of encoded quantized wavelet coefficients, wherein encoded quantized wavelet coefficients of the plurality of bands, which represent a group of rows of one of the frames, form a precinct, wherein the encoded quantized wavelet coefficients of the encoded quantized wavelet-filtered frame have been calculated using a coding mode of a plurality of coding modes,
    a plurality of tables, wherein each table of the plurality of tables relates to one coding mode of the plurality of coding modes, wherein each of the tables contains for each band of each precinct of the encoded quantized wavelet-filtered frame a gain value related to the coding mode to which the respective table relates;
    for each band of each precinct the coding mode of the encoded quantized wavelet coefficients, and
    a quantization parameter for each of the precincts;
using a decoding processor for producing for each of the encoded quantized wavelet-filtered frames a decoded quantized wavelet-filtered frame, wherein each of the decoded quantized wavelet-filtered frames comprises a plurality of decoded quantized wavelet coefficients, which are calculated by decoding the encoded quantized wavelet coefficients of the respective encoded quantized wavelet-filtered frame;
using a de-quantization processor for producing for each of the decoded quantized wavelet-filtered frames a de-quantized wavelet-filtered frame, wherein each of the de-quantized wavelet-filtered frames comprises a plurality of de-quantized wavelet coefficients, wherein the de-quantization processor is configured to calculate each of the de-quantized wavelet coefficients depending on a quantization value, which is a non-negative integer;
wherein the de-quantization processor calculates the quantization value for each of the decoded quantized wavelet coefficients depending on the quantization parameter for the precinct of the respective decoded quantized wavelet coefficient, depending on the coding mode of the precinct and the band of the encoded quantized wavelet coefficient corresponding to the respective decoded quantized wavelet coefficient, and depending on one of the gain values from the plurality of tables;
wherein the de-quantization processor retrieves the gain value for each of the decoded quantized wavelet coefficients, depending on the band and the precinct of the respective decoded quantized wavelet coefficient from the table of the plurality of tables, which relates to the coding mode of the respective decoded quantized wavelet coefficient;
using an inverse wavelet transform processor for producing for each of the de-quantized wavelet-filtered frames a frame of the consecutive frames, wherein each of the frames comprises a plurality of pixels, wherein each of the pixels of the frame is calculated by applying an inverse time transform operation to the respective de-quantized wavelet-filtered frame and one or more de-quantized wavelet-filtered frame preceding the respective de-quantized wavelet-filtered frame so as to produce an inverse time transformed de-quantized wavelet-filtered frame and by applying an inverse discrete wavelet transform to the inverse time transformed de-quantized wavelet-filtered frame, wherein the inverse time transform operation is applied in such way that each of the pixels is calculated by using a decoding mode of a plurality of decoding modes, wherein the decoding mode of one of the pixels correspond to the coding mode by which the encoded quantized wavelet coefficient corresponding to the one of the pixels has been calculated.

15. A non-transitory computer-readable storage medium containing computer program for, when running on a processor, executing the method according to claim 14.

* * * * *